(12) United States Patent
Dibble (10) Patent No.: US 8,468,086 B1
(45) Date of Patent: Jun. 18, 2013

(54) SYSTEM AND METHOD FOR PROTECTING A DEBT

(75) Inventor: Robert Dibble, Fair Oaks Ranch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 290 days.

(21) Appl. No.: 11/548,448

(22) Filed: Oct. 11, 2006

(51) Int. Cl.
*G06Q 40/00* (2012.01)

(52) U.S. Cl.
USPC ............... 705/38; 705/35; 705/37; 705/36 R; 707/202

(58) Field of Classification Search
USPC ....................................... 705/35, 38
See application file for complete search history.

(56) References Cited

U.S. PATENT DOCUMENTS

| | | | | |
|---|---|---|---|---|
| 5,426,281 | A * | 6/1995 | Abecassis | 235/379 |
| 6,009,402 | A | 12/1999 | Whitworth | |
| 6,088,686 | A * | 7/2000 | Walker et al. | 705/38 |
| 6,315,196 | B1 | 11/2001 | Bachman | |
| 7,246,068 | B2 * | 7/2007 | Thomas, Jr. | 705/2 |
| 7,324,950 | B2 * | 1/2008 | Sherman | 705/4 |
| 7,840,422 | B1 * | 11/2010 | Hail et al. | 705/4 |
| 2004/0128233 | A1 | 7/2004 | Jarzmik | |
| 2005/0060206 | A1 | 3/2005 | Mitchell | |
| 2005/0289044 | A1 | 12/2005 | Breslin et al. | |
| 2006/0116903 | A1 | 6/2006 | Becerra | |
| 2006/0242046 | A1 * | 10/2006 | Haggerty et al. | 705/35 |
| 2007/0087822 | A1 * | 4/2007 | Van Luchene | 463/25 |
| 2007/0203757 | A1 * | 8/2007 | Dibiasi et al. | 705/4 |

OTHER PUBLICATIONS

Best's Review: The Guide to Understanding Financial Protection Products. Jan. 2006; 49-75. Proquest. Protecting Property and Assets.*
Daley, James, Unwary customers become casualties in a credit card war: the indepenent, Feb. 25, 2006. (3 pages attached).*
ABA: American Bankers Association, "Banking & Finance Terminology", 1999, 4 pages attached.*
Daley, James, Unwary customers become casualties in a credit card war: the independent, Feb. 25, 2006. (3 pages).
www.bankofamerica.com, "Cardholder Security Plan", Bank of America web, archived Jun. 20, 2003.
www.csc.com, "Debt Protection Program", Computer Sciences Corporation, Copyright 2001, archived Jun. 20, 2003.
Anonymous, "Debt Cancellation Program Endorsed", American Bankers Association, ABA Banking Journal. New York: May 2003. vol. 95, Iss.5; p. 13, 2 pgs.

* cited by examiner

*Primary Examiner* — Kirsten S Apple
(74) *Attorney, Agent, or Firm* — Perkins Coie LLP

(57) ABSTRACT

Disclosed are systems and methods for protecting a debt. The systems and methods provide techniques for providing a set-amount loan to a customer, collecting a premium payment for the protection of a debt associated with the set-amount loan, receiving information about a debt excusing event that has occurred to the customer, and terminating at least a portion of the debt associated with the set-amount loan.

21 Claims, 4 Drawing Sheets

FIGURE 2

SYSTEM AND METHOD FOR PROTECTING A DEBT

CROSS REFERENCE TO RELATED APPLICATIONS

The present application is related to (1) U.S. Utility application Ser. No. 11/548,326, filed on Oct. 11, 2006, and (2) U.S. Utility application Ser. No. 11/548,557, filed on Oct. 11, 2006, the disclosures which are incorporated herein by reference.

FIELD OF THE DISCLOSURE

Various embodiments of the disclosure pertain to a system and method for protecting a debt and, more particularly, to a system and method which provide a set-amount loan to a customer, collect a premium payment for the protection of a debt associated with the set-amount loan, receive information about a debt excusing event that has occurred to the customer, and terminate at least a portion of the debt associated with the set-amount loan.

BACKGROUND

Protecting debt is well-known and readily appreciated by those of skill in the art. In the area of consumers loans, a customer may acquire a loan from a provider. In some situations, the customer may want to protect the debt associated with that loan and the provider may want to offer protection on the debt associated with that loan. For example, the customer may want to ensure that the debt will be taken care of in some manner if the customer is unable to pay off the debt in a timely manner such as, for example, if the customer were to die. Conventionally, the provider may offer an insurance product on which the customer pays a premium such that, in the event the customer were to die, the provider would pay off the debt. There are a number of issues that arise with respect to the offering of an insurance product to protect a debt.

Insurance products that are used to protect debt are regulated separately by each of the 50 states. This state-by-state individualized regulation results in there being different rules in each state for the provision of the products. This can make the insurance product for debt protection very expensive to administer. For example, every time the rates for such products are changes, those rate changes must be updated and filed in each state. Also, health questionnaires for the insurance products must be reviewed by each state, and every time these questionnaires change they must be updated and filed in each state. Furthermore, the forms that disclose the insurance product must be reviewed by each state, and every time these forms change they must be updated and filed in each state. These and other aspects of the individualized regulation of the insurance products make them very time consuming to administer and raises the costs associated with their provision.

Accordingly, it would be desirable to provide for protecting a debt absent the disadvantages discussed above.

SUMMARY

Various embodiments of the present disclosure are directed to systems and methods for protecting a debt. The systems and methods provide techniques for providing a set-amount loan to a customer, collecting a premium payment for the protection of a debt associated with the set-amount loan, receiving information about a debt excusing event that has occurred to the customer, and terminating at least a portion of the debt associated with the set-amount loan.

BRIEF DESCRIPTION OF THE DRAWINGS

FIG. 1b is a schematic view illustrating an embodiment of an information handling system used with the system for protecting a debt of FIG. 1a.

FIG. 1c is a schematic view illustrating an embodiment of a provider used in the system for protecting a debt of FIG. 1a.

DETAILED DESCRIPTION

Figure 1A:
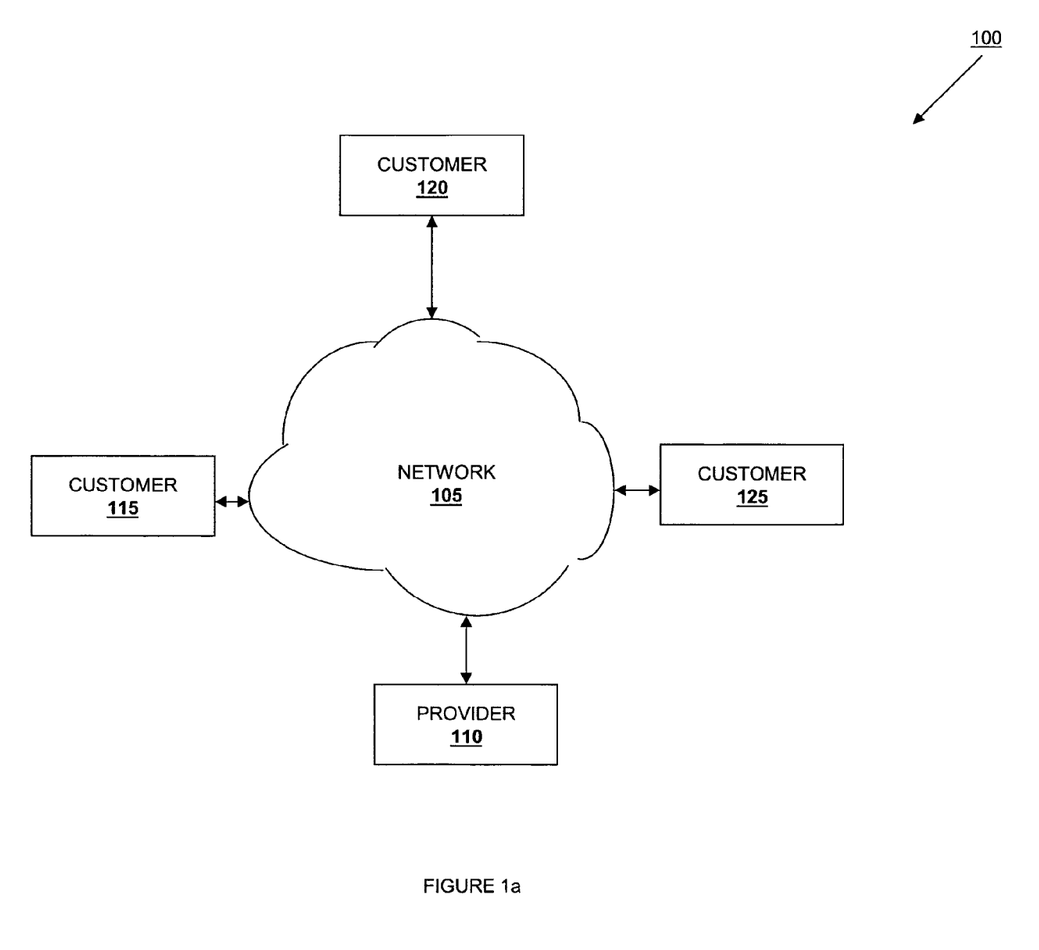
FIG. 1a is a schematic view illustrating an embodiment of a system for protecting a debt.

Referring now to FIG. 1a, in one embodiment, a system for protecting a debt 100 is illustrated. The system 100 includes a computer network 105 such as, for example, a Transport Control Protocol/Internet Protocol (TCP/IP) network (e.g., the internet or an intranet). A provider 110 is operably coupled to the network 105. A plurality of customers 115, 120 and 125 are also operably coupled to the network 105 in order to allow communication between the customers 115, 120 and 125 and the provider 110. In an embodiment, the provider 110 includes an loan provider. In an embodiment, the provider 110 includes a membership organization which provides a plurality of services for its members such as, for example, banking, insurance, financial services, loan providing, and/or a variety of other services known in the art, wherein the members include customers 115, 120 and 125. In an embodiment, the provider 110 includes anyone loaning funds. In an embodiment, the provider 110 is a third party to a customer and a loan provider where the loan provider loans funds to the customer. In an embodiment, the customers 115, 120 and 125 may be, for example, a person acquiring a debt, the family of a person acquiring a debt, or anyone associated with a person acquiring a debt who may have some liability for that debt.

Each of the provider 110 and the customers 115, 120, and 125 includes a respective network interface for communicating with the network 105 (e.g., outputting information to, and receiving information from, the network 105), such as by transferring information (e.g., instructions, data, signals) between such customers and the network 105. Accordingly, through the network 105, the provider 110 communicates with the customers 115, 120 and 125, and the customers 115, 120 and 125 communicate with the provider 110.

For clarity, FIG. 1a depicts only one provider 110. However, the system 100 may include a plurality of providers. Likewise, for clarity, FIG. 1a depicts only three customers 115, 120 and 125. However, the system 100 may include a plurality of customers. In the discussion below, the customer 115 is a representative one of the customers 115, 120 and 125.

Each of the provider 110 and the customers 115, 120 and 125 includes a respective information handling system (IHS), a subsystem, or a part of a subsystem for executing processes and performing operations (e.g., processing or communicating information) in response thereto, as discussed further below. Each such IHS is formed by various electronic circuitry components. Moreover, as illustrated in FIG. 1a, all such IHSs are coupled to each other. Accordingly, the provider 110 and the customers 115, 120, and 125 operate within the network 105.

An IHS is an electronic device capable of processing, executing or otherwise handling information. Examples of an IHS include a server computer, a personal computer (e.g., a desktop computer or a portable computer such as, for example, a laptop computer), or a handheld computer. Examples of an IHS also include a router, a switch and other devices coupled to a network (e.g., the network 105).

Figure 1B:
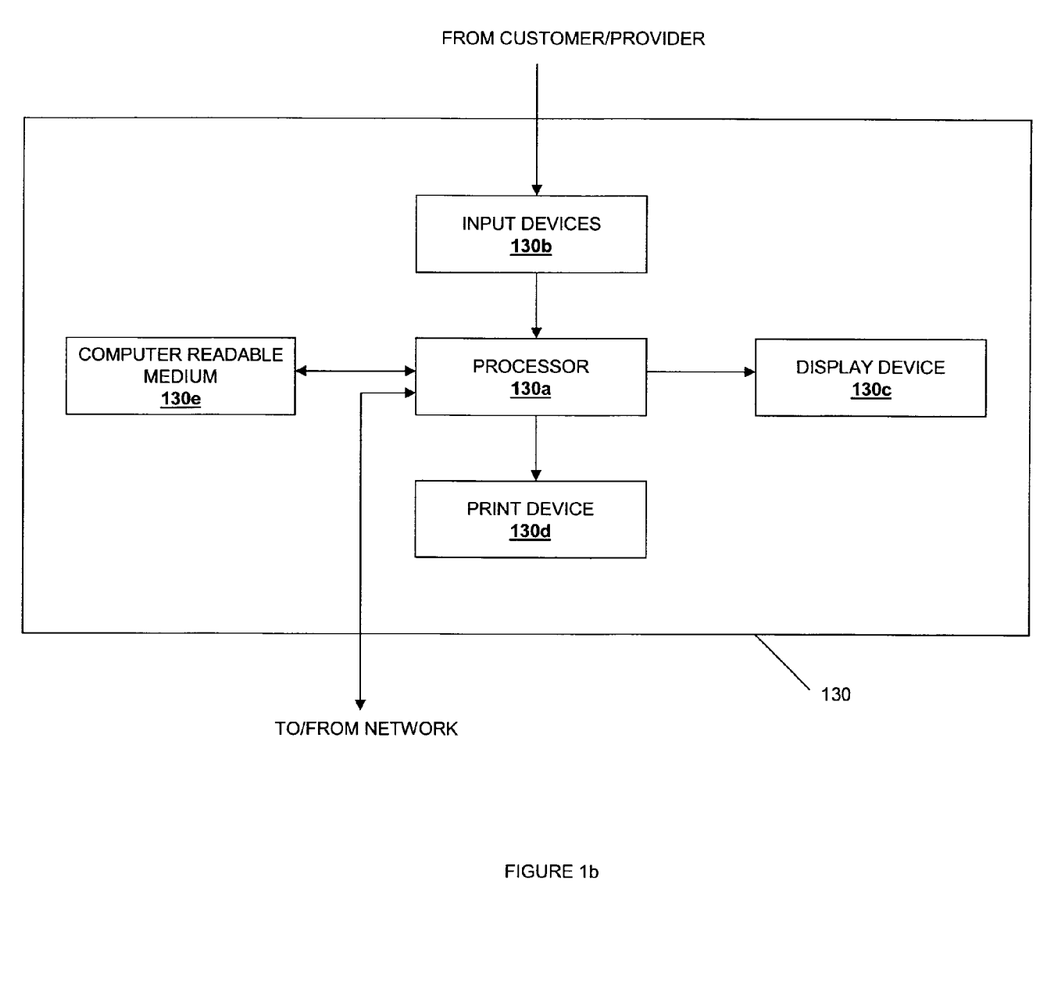

Referring now to FIG. 1b, an IHS 130 which is representative of one of the IHSs described above, is illustrated. The IHS 130 may include any or all of the following: (a) a processor 130a for executing and otherwise processing instructions, (b) a plurality of input devices 130b, which are operably coupled to the processor 130a, for inputting information, (c) a display device 130c (e.g., a conventional electronic cathode ray tub (CRT) device or a conventional liquid crystal display (LCD)), which is operably coupled to the processor 130a, for displaying information, (d) a print device 130d (e.g. a conventional electronic printer or plotter), which is operably coupled to the processor 130a, for printing visual images (e.g., textual or graphic information on paper), scanning visual images, and/or faxing visual images, (e) a computer readable medium 130e, which is operably coupled to the processor 130a, for storing information, as discussed further below, and (f) various other electronic circuitry for performing other operations of the IHS 130 known in the art.

For example, the IHS 130 includes (a) a network interface (e.g., circuitry) for communicating between the processor 130a and the network 105 and (b) a memory device (e.g., random access memory (RAM) device or read only memory (ROM) device for storing information (e.g., instructions executed by processor 130a and data operated upon by processor 130a in response to such instructions)). Accordingly the processor 130a is operably coupled to the network 105, the input devices 130b, the display device 130c, the print device 130d, and the computer readable medium 130e, as illustrated in FIG. 1b.

For example, in response to signals from the processor 130a, the display device 130c displays visual images. Information may be input to the processor 130a from the input devices 130b, and the processor 130a may receive such information from the input devices 130b. Also, in response to signals from the processor 130a, the print device 130d may print visual images on paper, scan visual images, and/or fax visual images.

The input devices include a variety of input devices known in the art such as, for example, a conventional electronic keyboard and a pointing device such as, for example, a conventional electronic "mouse", rollerball, or light pen. The keyboard may be operated to input alphanumeric text information to the processor 130a, and the processor 130a may receive such alphanumeric text information from the keyboard. The pointing device may be operated to input cursor-control information to the processor 130a, and the processor 130a may receive such cursor control information from the pointing device.

The computer readable medium 130e and the processor 130a are structurally and functionally interrelated with one another as described below in further detail. Each IHS of the illustrative embodiment is structurally and functionally interrelated with a respective computer readable medium, similar to the manner in which the processor 130a is structurally and functionally interrelated with the computer readable medium 130e. In that regard, the computer readable medium 130e is a representative one of such computer readable media including, for example, but not limited to, a hard disk drive.

The computer readable medium 130e stores (e.g., encodes, records, or embodies) functional descriptive material (e.g., including but not limited to software (also referred to as computer programs or applications) or data structures). Such functional descriptive material imparts functionality when encoded on the computer readable medium 130e. Also, such functional descriptive material is structurally and functionally interrelated to the computer readable medium 130e.

With such functional descriptive material, data structures define structural and functional interrelationships between such data structures and the computer readable medium 130e (and other aspects of the system 100). Such interrelationships permit the data structures' functionality to be realized. Also, within such functional descriptive material, computer programs define structural and functional interrelationships between such computer programs and the computer readable medium 130e (and other aspects of the system 100). Such interrelationships permit the computer programs' functionality to be realized.

For example, the processor 130a reads (e.g., accesses or copies) such functional descriptive material from the computer readable medium 130e onto the memory device of the IHS 130, and the IHS 130 (more particularly, the processor 130a) performs its operations (as described elsewhere herein) in response to such material which is stored in the memory device of the IHS 130. More particularly, the processor 130a performs the operation of processing a computer application (that is stored, encoded, recorded, or embodied on a computer readable medium) for causing the processor 130a to perform additional operations (as described elsewhere herein). Accordingly, such functional descriptive material exhibits a functional interrelationship with the way in which processor 130a executes its processes and performs its operations.

Further, the computer readable medium 130e is an apparatus from which the computer application is accessible by the processor 130a, and the computer application is processable by the processor 130a for causing the processor 130a to perform such additional operations. In addition to reading such functional descriptive material from the computer readable medium 130e, the processor 130a is capable of reading such functional descriptive material from (or through) the network 105 which is also a computer readable medium (or apparatus). Moreover, the memory device of the IHS 130 is itself a computer readable medium (or apparatus).

Figure 1C:
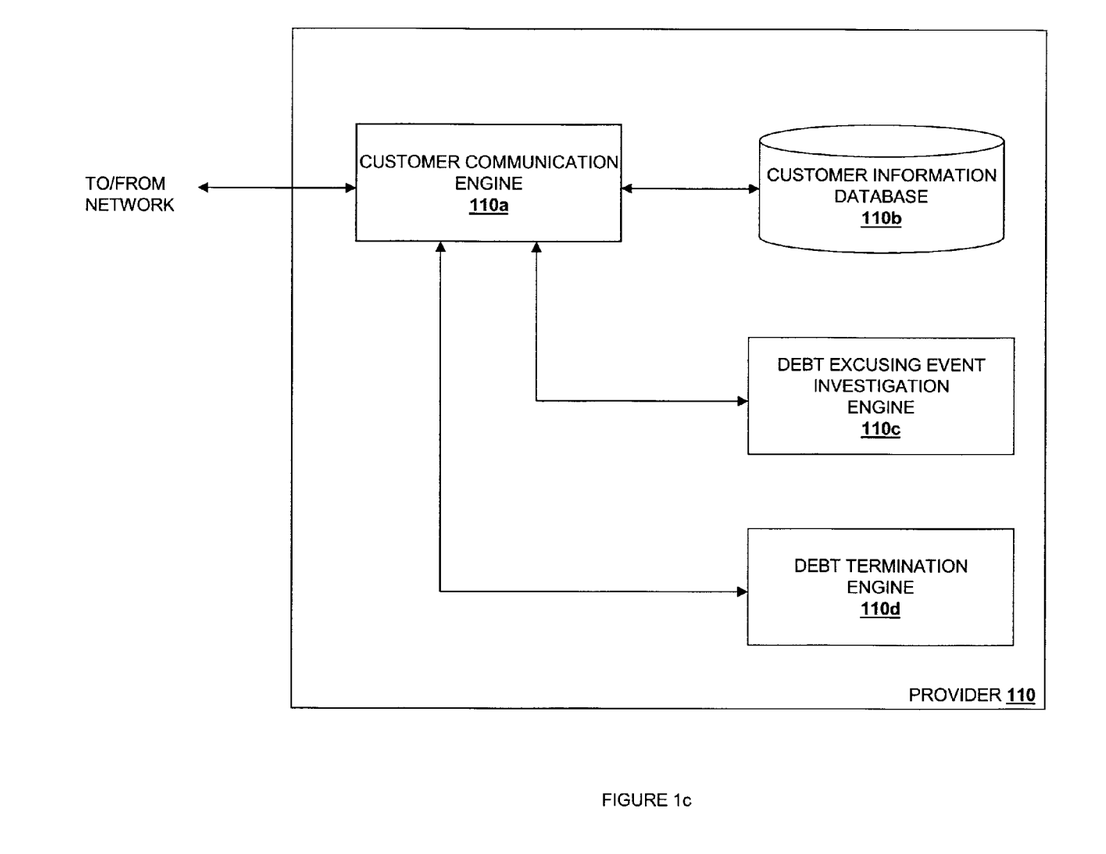

Referring now to FIGS. 1a, 1b and 1c, the provider 110 is illustrated in more detail. A customer communication engine 110a which may be, for example, software stored on the computer-readable medium 130e in the IHS 130, is included in the provider 110 and is operably coupled to the network 105, described above with reference to FIG. 1a, and to a customer information database 110b. A debt excusing event investigation engine 110c which may be, for example, software stored on the computer-readable medium 130e in the IHS 130 or a representative of the provider 110, is included in the provider 110 and is operably coupled to the customer communication engine 110a and to the network 105, described above with reference to FIG. 1a. An debt termination engine 110d which may be, for example, software stored on the computer-readable medium 130e in the IHS 130 or a representative of the provider 110, is included in the provider 110 and is operably coupled to the customer communication engine 110a and to the network 105, described above with reference to FIG. 1a. In an embodiment, the customer information database 110b is a conventional database known in the art. In an embodiment, the customer information database 110b may be located outside the provider 110 and still operably coupled to the provider 110 and the customer communication engine 110a through, for example, the network 105, described above with reference to FIG. 1a. In an embodiment, the customer information database 110b includes a plurality of databases. In an embodiment, the provider 110 is a membership organization and the customer information database 110b includes a variety of previously collected information on members of the membership organization. In an embodiment, the customer information database 110b is a publicly available database. In an embodiment, the customer information database 110b is a private database which is available to be accessed by the provider 110.

Referring now to FIGS. 1a, 1b, 1c and 2, a method 200 for protecting a debt is illustrated. The method 200 begins at step 202 where a loan is provided to a customer. In an embodiment, the customer 115 communicates with the provider 110, and the provider 110 communicates with the customer 115, through the customer communication engine 110a regarding the provision of a set-amount loan from the provider 110 to the customer 115. In an embodiment, the customer 115 and the provider 110 may communicate in person, through the network 105, and/or in a variety of other manners known in the art. The set-amount loan may be a variety of loans known in the art whereby a set amount of money is loaned by a loan provider, which may be the provider 110, to the customer 115 and an interest amount related to an interest rate is charged by the loan provider on the set-amount loan. In an embodiment, the set-amount loan may be, for example, a fixed rate loan, an adjustable rate loan, an interest only loan, an amortizing loan, and/or a variety of other set-amount loans known in the art. In an embodiment, the set-amount loan may be securitized loan whereby the loan is secured by collateral such as, for example, an auto loan, a home loan, a home equity loan, and/or a variety of other securitized loans known in the art. In step 202, the customer 115 and the loan provider determine the amount of the set-amount loan to be provided, the interest rate to be charged on that set-amount loan, and if applicable, the collateral to be used in order to securitize the set-amount loan. In an embodiment, the provider 110 may access the customer information database 110b in order to obtain information about the customer 115 for use in determining the amount of the set-amount loan and the interest rate to charge on the set-amount loan such as, for example, the credit history of the customer 115. In an embodiment, the provider 110 is a membership organization and the customer 115 is a member of that membership organization and the customer information database 110b includes information on the customer 115 for use in determining the amount of the set-amount loan and the interest rate to charge on the set-amount loan such as, for example, the accounts of the customer 115 held by the provider 110, details on the property owned by the customer 115 and loans provided by the provider 110 related to that property, insurance provided by the provider 110 to the customer 115, and/or a variety of other information known in the art that is relevant in determining the amount of a loan to be provided and the interest rate to charge on that loan. The set-amount loan is then provided to the customer 115 by the loan provider and a debt associated with the set-amount loan is acquired by the customer 115.

Figure 2:
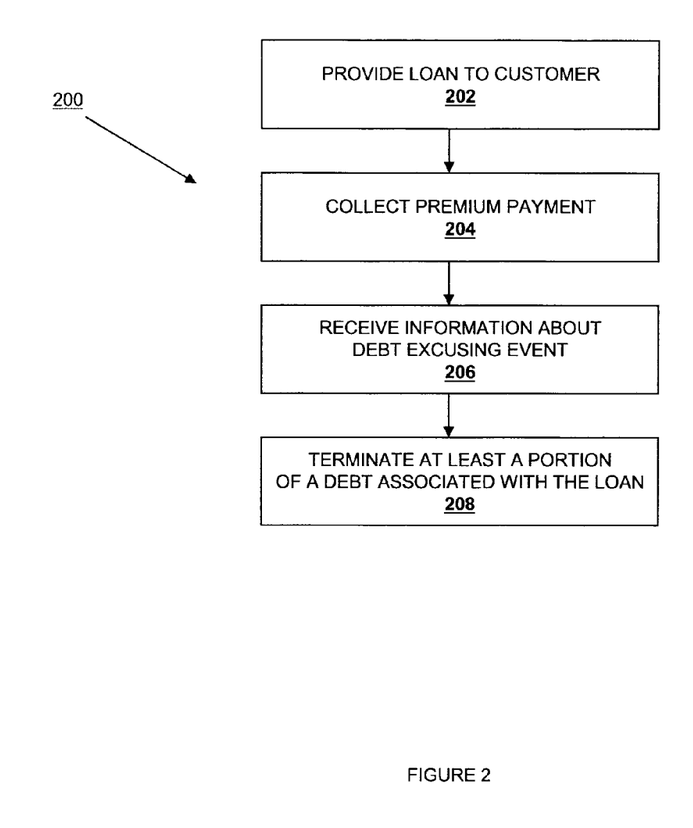
FIG. 2 is a flow chart illustrating an embodiment of a method for protecting a debt.

The method 200 then proceeds to step 204 where a premium payment is collected. If the customer 115 determines that they would like to protect the debt associated with the set-amount loan, the customer 115 may provide a premium payment to the provider 110. The customer 115 may decide to protect the debt associated with the set-amount loan and begin the premium payments upon first acquiring the set-amount loan or at some time during the life of the set-amount loan. The premium payment may vary based on the amount of debt that the customer 115 wishes to protect, the type of debt excusing events that the customer 115 wishes to insure against, and/or a variety of other factors known in the art. In an embodiment, the premium payment may be a monthly payment. In an embodiment, the premium payment may be calculated as a percentage of the monthly outstanding balance on the set-amount loan.

In an experimental embodiment 800, the premium payments for debt protection on a plurality of set-amount loans were calculated as a percentage of the outstanding balance owed on the set-amount loan, as illustrated in the following table:

| Amount 802 | Term 804 | Annual Percent. Rate 806 | Disability/ Unempl./ Hospit. OB Rate per $1000 808 | Accid. Death OB Rate per $1000 810 | Total Life OB Rate per $1000 812 | Total OB Rate per $1000 814 | Month 1 OB Fee 816 | Average OB Fee 818 |
|---|---|---|---|---|---|---|---|---|
| $20,000 | 12 | 7.50% | 9.52 | 0.09 | 0.00 | 9.61 | $192.20 | $105.32 |
| $20,000 | 24 | 7.50% | 5.07 | 0.07 | 0.26 | 5.40 | $108.00 | $57.83 |
| $20,000 | 36 | 7.50% | 3.51 | 0.05 | 0.45 | 4.01 | $80.20 | $43.13 |
| $20,000 | 48 | 7.50% | 2.72 | 0.04 | 0.56 | 3.32 | $66.40 | $36.06 |
| $20,000 | 60 | 7.50% | 2.23 | 0.03 | 0.64 | 2.90 | $58.00 | $31.95 |
| $20,000 | 72 | 7.50% | 1.91 | 0.03 | 0.69 | 2.63 | $52.60 | $29.30 |
| $20,000 | 84 | 7.50% | 1.68 | 0.02 | 0.73 | 2.43 | $48.60 | $27.46 |
| $20,000 | 96 | 7.50% | 1.50 | 0.02 | 0.76 | 2.28 | $45.60 | $26.14 |
| $20,000 | 108 | 7.50% | 1.37 | 0.02 | 0.78 | 2.17 | $43.40 | $25.15 |
| $20,000 | 120 | 7.50% | 1.26 | 0.02 | 0.80 | 2.08 | $41.60 | $24.39 |

Experimental embodiment 800 provides debt protection coverage for disability of the customer 115, unemployment of the customer 115, hospitalization of the customer 115, accidental death of the customer 115, and total life (death of the customer 115 other than accidental death of the customer 115). The amount 802 of the set-amount loan was set at $20,000, and the term 804 was varied from 12 months to 120 months. The annual percentage rate 806, or interest rate, was set at 7.50%. The outstanding balance rate per $1000 of the set-amount loan for disability, unemployment, and hospitalization 808 was $9.52 for a 12 month term, $5.07 for a 24 month term, $3.51 for a 36 month term, $2.72 for a 48 month term, $2.23 for a 60 month term, $1.91 for a 72 month term, $1.68 for an 84 month term, $1.50 for a 96 month term, $1.37 for a 108 month term and $1.26 for a 120 month term. The outstanding balance rate per $1000 of the set-amount loan for accidental death 810 was $0.09 for a 12 month term, $0.07 for a 24 month term, $0.05 for a 36 month term, $0.04 for a 48 month term, $0.03 for a 60 month term, $0.03 for a 72 month term, $0.02 for an 84 month term, $0.02 for a 96 month term, $0.02 for a 108 month term and $0.02 for a 120 month term. The outstanding balance rate per $1000 of the set-amount loan for total life 812 was $0.00 for a 12 month term, $0.26 for a 24 month term, $0.45 for a 36 month term, $0.56 for a 48 month term, $0.64 for a 60 month term, $0.69 for a 72 month term, $0.73 for an 84 month term, $0.76 for a 96 month term, $0.78 for a 108 month term and $0.80 for a 120 month term. The total outstanding balance rate per $1000 of the set-amount loan 814 was $9.61 for a 12 month term, $5.40 for a 24 month term, $4.01 for a 36 month term, $3.32 for a 48 month term, $2.90 for a 60 month term, $2.63 for a 72 month term, $2.43 for an 84 month term, $2.28 for a 96 month term, $2.17 for a 108 month term and $2.08 for a 120 month term. The first month outstanding balance fee for the set-amount loan 816, i.e. the first premium payment for debt protection on the set-amount loan, was $192.20 for a 12 month term, $108.00 for a 24 month term, $80.20 for a 36 month term, $66.40 for a 48 month term, $58.00 for a 60 month term, $52.60 for a 72 month term, $48.60 for an 84 month term, $45.60 for a 96 month term, $43.40 for a 108 month term and $41.60 for a 120 month term. The average monthly outstanding balance fee for the life of the set-amount loan 818, i.e. the average monthly premium payment for debt protection on the set-amount loan, was $105.32 for a 12 month term, $57.83 for a 24 month term, $43.13 for a 36 month term, $36.06 for a 48 month term, $31.95 for a 60 month term, $29.30 for a 72 month term, $27.46 for an 84 month term, $26.14 for a 96 month term, $25.15 for a 108 month term, and $24.39 for a 120 month term. Because the premium payment was calculated as a percentage of the outstanding balance of the set-amount loan, the premium payment reduces as the balance of the loan is paid off. Therefore, the premium payment will start with the first month outstanding balance fee for the set-amount loan 816 and reduce over the life of the loan, with an average monthly outstanding balance fee for the life of the set-amount loan 818.

In an experimental embodiment 900, the premium payments for debt protection on a plurality of set-amount loans were calculated as a percentage of the outstanding balance owed on the set-amount loan, as illustrated in the following table:

months to 120 months. The annual percentage rate 906, or interest rate, was set at 7.50%. The outstanding balance rate per $1000 of the set-amount loan for disability, unemployment, and hospitalization 908 was $4.21 for a 12 month term, $2.24 for a 24 month term, $1.55 for a 36 month term, $1.20 for a 48 month term, $0.99 for a 60 month term, $0.84 for a 72 month term, $0.74 for an 84 month term, $0.67 for a 96 month term, $0.61 for a 108 month term and $0.56 for a 120 month term. The outstanding balance rate per $1000 of the set-amount loan for accidental death 910 was $0.09 for a 12 month term, $0.07 for a 24 month term, $0.05 for a 36 month term, $0.04 for a 48 month term, $0.03 for a 60 month term, $0.03 for a 72 month term, $0.02 for an 84 month term, $0.02 for a 96 month term, $0.02 for a 108 month term and $0.02 for a 120 month term. The outstanding balance rate per $1000 of the set-amount loan for total life 912 was $0.00 for a 12 month term, $0.26 for a 24 month term, $0.45 for a 36 month term, $0.56 for a 48 month term, $0.64 for a 60 month term, $0.69 for a 72 month term, $0.73 for an 84 month term, $0.76 for a 96 month term, $0.78 for a 108 month term and $0.80 for a 120 month term. The total outstanding balance rate per $1000 of the set-amount loan 914 was $4.30 for a 12 month term, $2.57 for a 24 month term, $2.05 for a 36 month term, $1.80 for a 48 month term, $1.66 for a 60 month term, $1.56 for a 72 month term, $1.49 for an 84 month term, $1.45 for a 96 month term, $1.41 for a 108 month term and $1.38 for a 120 month term. The first month outstanding balance fee for the set-amount loan 916, i.e. the first premium payment for debt protection on the set-amount loan, was $86.00 for a 12 month term, $51.40 for a 24 month term, $41.00 for a 36 month term, $36.00 for a 48 month term, $33.20 for a 60 month term, $31.20 for a 72 month term, $29.80 for an 84 month term, $29.00 for a 96 month term, $28.20 for a 108 month term, and $27.60 for a 120 month term. The average monthly outstanding balance fee for the life of the set-amount loan 918, i.e. the average monthly premium payment for debt protection on the set-amount loan, was $47.11 for a 12 month term, $27.64 for a 24 month term, $22.26 for a 36 month term, $19.84 for a 48 month term, $18.51 for a 60 month term, $17.70 for a 72 month term, $17.17 for an 84 month term, $16.82 for a 96 month term, $16.58 for a 108 month term and $16.43 for a 120 month term. Because the premium payment was calculated as

| Amount 902 | Term 904 | Annual Percent. Rate 906 | Disability OB Rate per $1000 908 | Accid. Death OB Rate per $1000 910 | Total Life OB Rate per $1000 912 | Total OB Rate per $1000 914 | Month 1 OB Fee 916 | Average OB Fee 918 |
|---|---|---|---|---|---|---|---|---|
| $20,000 | 12 | 7.50% | 4.21 | 0.09 | 0.00 | 4.30 | $86.00 | $47.11 |
| $20,000 | 24 | 7.50% | 2.24 | 0.07 | 0.26 | 2.57 | $51.40 | $27.64 |
| $20,000 | 36 | 7.50% | 1.55 | 0.05 | 0.45 | 2.05 | $41.00 | $22.26 |
| $20,000 | 48 | 7.50% | 1.20 | 0.04 | 0.56 | 1.80 | $36.00 | $19.84 |
| $20,000 | 60 | 7.50% | 0.99 | 0.03 | 0.64 | 1.66 | $33.20 | $18.51 |
| $20,000 | 72 | 7.50% | 0.84 | 0.03 | 0.69 | 1.56 | $31.20 | $17.70 |
| $20,000 | 84 | 7.50% | 0.74 | 0.02 | 0.73 | 1.49 | $29.80 | $17.17 |
| $20,000 | 96 | 7.50% | 0.67 | 0.02 | 0.76 | 1.45 | $29.00 | $16.82 |
| $20,000 | 108 | 7.50% | 0.61 | 0.02 | 0.78 | 1.41 | $28.20 | $16.58 |
| $20,000 | 120 | 7.50% | 0.56 | 0.02 | 0.80 | 1.38 | $27.60 | $16.43 |

Experimental embodiment 900 provides debt protection coverage for disability of the customer 115, accidental death of the customer 115, and total life (death of the customer 115 other than accidental death of the customer 115) in order to allow for lower premium payments than experimental embodiment 800 above. The amount 902 for the set-amount loan was set at $20,000, and the term 904 was varied from 12 a percentage of the outstanding balance of the set-amount loan, the premium payment reduces as the balance of the loan is paid off. Therefore, the premium payment will start with the first month outstanding balance fee for the set-amount loan 916 and reduce over the life of the loan, with an average monthly outstanding balance fee for the life of the set-amount loan 918.

The method 200 then proceeds to step 206 where the provider 110 receives information about a debt excusing event that has occurred to the customer 115. The customer 115 experiences a debt excusing event that the customer 115 communicates to the provider 110. In an embodiment, the debt excusing event is communicated to the provider 110 in person, through the network 105, and/or in a variety of other manners known in the art. In an embodiment, the debt excusing event may be, for example, the death of the person acquiring the debt associated with the set-amount loan, the disability of the person acquiring the debt associated with the set-amount loan, the unemployment of the person acquiring the debt associated with the set-amount loan, the military deployment of the person acquiring the debt associated with the set-amount loan, a medical leave of the person acquiring the debt associated with the set-amount loan, the marriage of the person acquiring the acquiring the debt associated with the set-amount loan, the birth of a child to the person acquiring the debt associated with the set-amount loan, and/or a variety of other debt excusing events known in the art. In an embodiment, the death of the person acquiring the debt may include, for example, death associated with unforeseen events related to military training, death associated with acts of war, death associated with acts of terrorism, and/or a variety of other military related deaths known in the art. Upon receiving information about the debt excusing event through the customer communication engine 110a, the debt excusing event investigation engine 110c begins an investigation into the debt excusing event to ensure that the debt excusing event has occurred as reported to and received by the provider 110 in step 206 of the method 200.

The method 200 then proceeds to step 208 where at least a portion of the debt associated with the set-amount loan is terminated. Upon the debt excusing event investigation engine 110c confirming that the debt excusing event has occurred, the debt termination engine 110d references the customer information database 110b to determine the type of debt protection that the customer 115 has on the loan provided in step 202 of the method 200 and at least a portion of the debt associated with the set-amount loan is terminated using the debt termination engine 110d. In an embodiment, the debt may be terminated, for example, by the provider 110 terminating the entire amount or balance of the set-amount loan, by the provider 110 terminating the minimum balance of the set-amount loan for a period of time such as, for example, the monthly minimum balance, by the provider 110 terminating a portion of the balance of the set-amount loan, by the provider 110 terminating the interest associated with the set-amount loan for a period of time, by the provider 110 deferring payments on the set-amount loan for a period of time, by a third party provider 110 paying the entire amount or balance of the set-amount loan, by the a third party provider 110 paying the minimum balance of the set-amount loan for a period of time such as, for example, the monthly minimum balance, by the a third party provider 110 paying a portion of the balance of the set-amount loan, by the a third party provider 110 paying the interest on the set-amount loan for a period of time, and/or a variety of other debt terminations known in the art. In an embodiment, a cap may be put on the termination of the debt such as, for example, a $750 cap on monthly debt terminations such as the terminating/paying off of a monthly payment, or a $50,000 cap on full debt termination. In an embodiment, the provider 110 may be a membership organization that provides a plurality of loans to its member customers, and the provider 110 may cap their monthly debt terminations at an amount that encompasses the majority of their loan portfolio (e.g. 90% of the loan portfolio) while keeping the premium payment as low as possible. In an embodiment, the provider 110 may be a membership organization that provides a plurality of loans to its member customers, and the provider 110 may cap their full debt terminations at an amount that encompasses the majority of their loan portfolio (e.g. 95% of the loan portfolio) while keeping the premium payment as low as possible. In an embodiment, limitations are placed on the termination of debt such as, for example, there may be a 90 day time period that must pass in order for the customer 115 to be able to have debt termination for the disability, hospitalization, or unemployment of the customer 115, there may be no debt termination for a condition where the customer 115 has received a medical diagnosis or treatment 6 months prior to the first premium payment that results in a disability or hospitalization within 6 months after the first premium payment, there may be a one year period wherein death must be accidental after which all non-suicidal or self inflicted deaths qualify for debt termination, there may be a 12 month maximum on debt termination associated with disability, hospitalization, and/or unemployment of the customer 115, there may be a 30 day retroactive wait period for debt termination associated with disability or unemployment, there may be no debt termination for pre-existing conditions associated with disability or hospitalization, there may be a 2 night maximum stay for debt termination associated with hospitalization, there may be no debt terminations associated with self inflicted disabilities or hospitalizations, there may be no debt terminations associated with unemployment due to voluntary resignation or retirement or related to part-time, seasonal, or self employed customers, there may be no debt termination for unemployment unless the customer 115 works a minimum of 30 hours per week and/or qualifies for state unemployment benefits, and/or there may be a 30 day retroactive wait period for disability or unemployment whereby a debt termination claim will not be approved for 30 days after the reporting of the disability or unemployment is reported to the provider 110, but after 30 days and approval, the debt termination will apply retroactively to the date of reporting. Thus, a system and method are provided that allow a customer to protect debt associated with a set-amount loan for debt excusing events such as, for example, military deployment.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system for protecting a debt, the system comprising at least one subsystem for:
   communicating with a customer for the purpose of providing a set-amount loan to the customer, wherein the set amount loan comprises a set amount of money loaned to the customer and an interest rate charged on the set amount of money to be loaned;
   consulting a customer information database having preexisting information on the customer to determine the set amount of money and the interest rate to charge the customer;
   calculating a premium payment for the protection of a predetermined portion of the debt owed on the set-amount loan provided to the customer based on an amount of the predetermined portion, a term of the set-amount loan, an interest rate of the set-amount loan, and a debt excusing event to be insured against, wherein the premium payment decreases as an amount owed on the set-amount loan decreases;
calculating an average periodic premium payment for the protection;
collecting the premium payment;
receiving information about the debt excusing event that has occurred to the customer;
based on the receiving information about the debt excusing event, conducting an investigation into the debt excusing event to determine that the debt excusing event occurred as reported; and
paying at least a portion of the debt owed on the set-amount loan provided to the customer.

2. The system of claim 1, wherein the set-amount loan is a securitized loan.

3. The system of claim 1, wherein the debt excusing event comprises a military deployment of the customer.

4. The system of claim 1, wherein the paying at least a portion of the debt associated with the set-amount loan provided to the customer comprises paying the entire amount of the debt associated with the set-amount loan provided to the customer.

5. The system of claim 1, wherein the paying at least a portion of the debt associated with the set-amount loan provided to the customer comprises paying the minimum monthly balance owed on the set-amount loan for a period of time.

6. The system of claim 1, wherein the paying at least a portion of the debt associated with the set-amount loan provided to the customer comprises paying the interest associated with the set-amount loan for a period of time.

7. The system of claim 1, wherein the debt excusing event comprises the accidental death of the customer before the expiration of a period of time following the first instance of collecting a premium payment and the debt excusing event comprises the death of the customer after the period of time following the first instance of collecting a premium payment.

8. A computer-readable medium comprising computer-readable instructions for protecting a debt, said computer-readable instructions comprising instructions for:
communicating with a customer for the purpose of providing a set-amount loan to the customer, wherein the set amount loan comprises a set amount of money loaned to the customer and an interest rate charged on the set amount of money to be loaned;
consulting a customer information database having preexisting information on the customer to determine the set amount of money and the interest rate to charge the customer;
collecting a premium payment for the protection of a pre-determined portion of the debt owed on the set-amount loan provided to the customer and a debt excusing event to be insured against;
receiving information about the debt excusing event that has occurred to the customer;
based on the receiving information about the debt excusing event, conducting an investigation into the debt excusing event to determine that the debt excusing event occurred as reported; and
paying at least a portion of the debt owed on the set-amount loan provided to the customer.

9. The computer-readable medium of claim 8, wherein the set-amount loan is a securitized loan.

10. The computer-readable medium of claim 8, wherein the debt excusing event comprises a military deployment of the customer.

11. The computer-readable medium of claim 8, wherein the paying at least a portion of the debt associated with the set-amount loan provided to the customer comprises paying the entire amount of the debt associated with the set-amount loan provided to the customer.

12. The computer-readable medium of claim 8, wherein the paying at least a portion of the debt associated with the set-amount loan provided to the customer comprises paying the minimum monthly balance owed on the set-amount loan for a period of time.

13. The computer-readable medium of claim 8, wherein the paying at least a portion of the debt associated with the set-amount loan provided to the customer comprises paying the interest associated with the set-amount loan for a period of time.

14. The computer-readable medium of claim 8, wherein the debt excusing event comprises the accidental death of the customer before the expiration of a period of time following the first instance of collecting a premium payment and the debt excusing event comprises the death of the customer after the period of time following the first instance of collecting a premium payment.

15. A method for protecting a debt, the method comprising:
communicating with a customer for the purpose of providing a set-amount loan to the customer, wherein the set amount loan comprises a set amount of money loaned to the customer and an interest rate charged on the set amount of money to be loaned;
consulting a customer information database having preexisting information on the customer to determine the set amount of money and the interest rate to charge the customer;
collecting a premium payment for the protection of a pre-determined portion of the debt owed on the set-amount loan provided to the customer and a debt excusing event to be insured against;
receiving information about the debt excusing event that has occurred to the customer at a debt excusing event investigation engine;
based on the receiving information about the debt excusing event, conducting an investigation into the debt excusing event to determine that the debt excusing event occurred as reported; and
paying at least a portion of the debt owed on the set-amount loan provided to the customer.

16. The method of claim 15, wherein the set-amount loan is a securitized loan.

17. The method of claim 15, wherein the debt excusing event comprises a military deployment of the customer.

18. The method of claim 15, wherein the paying at least a portion of the debt associated with the set-amount loan provided to the customer comprises paying the entire amount of the debt associated with the set-amount loan provided to the customer.

19. The method of claim 15, wherein the paying at least a portion of the debt associated with the set-amount loan provided to the customer comprises paying the minimum monthly balance owed on the set-amount loan for a period of time.

20. The method of claim 15, wherein the paying at least a portion of the debt associated with the set-amount loan provided to the customer comprises paying the interest associated with the set-amount loan for a period of time.

21. The method of claim 15, wherein the debt excusing event comprises the accidental death of the customer before the expiration of a period of time following the first instance of collecting a premium payment and the debt excusing event comprises the death of the customer after the period of time following the first instance of collecting a premium payment.

* * * * *